United States Patent [19]
Buchanan, Jr.

[11] Patent Number: 5,605,071
[45] Date of Patent: Feb. 25, 1997

[54] ENVELOPED WORM GEAR CLUTCH WEDGELOCK RESPONSIVE TO REACTION FORCE

[75] Inventor: Harry C. Buchanan, Jr., Spring Valley, Ohio

[73] Assignee: ITT Automotive Electrical Systems, Inc., Auburn Hills, Mich.

[21] Appl. No.: 468,721

[22] Filed: Jun. 6, 1995

[51] Int. Cl.$^6$ .............................. F16H 55/22; F16H 1/16; B60T 7/12
[52] U.S. Cl. .................. 74/425; 74/458; 188/134
[58] Field of Search ................ 74/89.14, 425, 74/458; 188/134

[56] References Cited

U.S. PATENT DOCUMENTS

| | | | |
|---|---|---|---|
| 1,685,656 | 9/1928 | West | 74/425 X |
| 2,002,746 | 5/1935 | Miller | 74/458 |
| 2,173,660 | 9/1939 | Perkins | 74/425 |
| 2,273,784 | 2/1942 | Kahl | 74/458 X |
| 2,279,414 | 4/1942 | Scott | 74/458 |
| 2,284,202 | 5/1942 | Hammond et al. | 192/7 |
| 2,284,203 | 5/1942 | Hammond | 192/7 |
| 2,341,968 | 2/1944 | West | 74/458 X |
| 2,619,845 | 12/1952 | Mackmann et al. | 74/458 |
| 3,535,948 | 10/1970 | Winzeler et al. | 74/440 |
| 4,153,825 | 5/1979 | Flora | 200/47 |
| 4,521,055 | 6/1985 | Fudala | 297/362 |
| 4,570,999 | 2/1986 | Harrison | 297/362 |
| 4,630,497 | 12/1986 | Nelson | 74/425 |
| 4,644,812 | 2/1987 | Nelson | 74/425 |
| 4,685,735 | 8/1987 | McFalls et al. | 297/362 |
| 4,739,671 | 4/1988 | Nelson | 74/425 |
| 5,018,403 | 5/1991 | Umezono et al. | 74/425 |
| 5,295,730 | 3/1994 | Rees | 297/361.1 |

FOREIGN PATENT DOCUMENTS

| | | |
|---|---|---|
| 2456265 | 12/1980 | France . |
| 2567462 | 1/1986 | France . |
| 2822135 | 11/1979 | Germany . |
| 1180590 | 9/1985 | Russian Federation . |
| 1717878 | 3/1992 | Russian Federation . |
| 485142 | 3/1970 | Switzerland . |
| 89/03322 | 4/1989 | WIPO . |

*Primary Examiner*—Allan D. Herrmann
*Attorney, Agent, or Firm*—Thomas N. Thomey; J. Gordon Lewis

[57] ABSTRACT

An apparatus is responsive to a reaction force of intermeshing gear members that transmit force through an angle. The gear members include an elongated enveloped worm with a longitudinally extending axis of rotation and an output gear with an axis of rotation offset from and perpendicular to the longitudinally extending axis of the worm gear. The worm gear is movable axially in response to a predetermined reaction force or predetermined torque force. At least one biasing member is disposed adjacent one end of the worm gear, and preferably both ends of the worm gear, for centering the worm gear with respect to the output gear when subjected to a force below the predetermined reaction force or predetermined torque force.

19 Claims, 2 Drawing Sheets

ENVELOPED WORM GEAR CLUTCH WEDGELOCK RESPONSIVE TO REACTION FORCE

FIELD OF THE INVENTION

The present invention generally relates to worm gears, and in particular, to enveloped worm gears used for driving an output gear and/or that drive a load into a hard stop.

BACKGROUND OF THE INVENTION

Linear pitch worm gears for driving engagement with a circular pitch gear are well known. The mesh of common straight worm gearing provides one to one and one-half gear teeth in contact with the worm. Enveloped worm gears operably engaging with circular pitch gears are also well known, as well as double-enveloping worm and gear sets which wrap around each other to greatly increase the load carrying capacity by providing more tooth area contact and more teeth in mesh than other worm gear designs. The double enveloping design gear set can also carry loads which would require straight worm gearing that is much larger and heavier. It is well known that the double enveloping worm and gear set provide many advantages including: extra torque with no increase in size, or conversely, smaller, more reliable speed reducers; high shock resistance, and the ability to withstand heavy starting and stopping loads, low backlash due to the inherent precision of the double enveloping design; increased durability and longer gear life; and design flexibility resulting from smaller and lighter envelopes. The worm is centered on the center line of the gear to ensure uniform gear to worm fit with respect to the pitch diameter.

Double enveloping worm gears, sometimes referred to as Cone-drive worm gears, have been used for many different applications and for a wide range of ratios, including reductions up to 180 to 1 and speed increases up to 1 to 6. Speed variations have been known to range from 30,000 revolutions per minutes (RPM) down to $\frac{1}{15}$ revolution per minute and sizes from 1 inch to many feet in diameter for gear wheels. Known experiments have indicated that the efficiency of worm gearing increases with the angle of inclination, up to a certain point. These experiments also show that for larger angles of inclination than 25° to 30° the efficiency increases very little, especially if the coefficient of friction is small. The coefficient of friction depends on the lubricant; the pressure between the teeth; and velocity of sliding. Previously known tests have also indicated that the coefficient of friction may vary from 0.01 for a good lubricant to 0.05 for an inferior lubricant, assuming all losses are due to the worm gearing. Besides the friction between the worm and the wheel teeth, there is also the friction of the spindle bearings and the ball bearings for taking the axial thrust. It is known that when the coefficient of friction equals the tangent of the lead or helix angle, the gearing is self-locking and the worm cannot be rotated by the wheel. It is impossible to obtain an efficiency greater than 50% at starting, if the gears are to be self-locking. Of course, there is always some friction in the worm-shaft bearings and other parts of the machinery which may prevent the pressure on the worm gear from actually turning the machinery, as a whole, backwards, even if the worm gearing alone is not self-locking. This, in connection with the fact that the efficiency for backward movement is low, is probably the reason why many worm gear drives applied as self-locking have lead angles in excess of the self-locking angle and yet work satisfactorily. Multiple-threaded types of worm gearing can also be employed.

SUMMARY OF THE INVENTION

The present invention takes advantage of the unique characteristics of enveloped worm gearing, such that non-centering of the worm with respect to the gear causes tooth and pitchline interference, typically resulting in what would normally be undesirable jamming and rotary friction. The present invention uses the reaction torque of the worm to force a preloaded worm off center to cause pitchline interference to jam, or brake, the stored rotary energy in a rotor or armature, thereby eliminating the need for an elaborate spring, or rubber energy take-up device, used in actuators that drive a load into a hard stop. Care is taken in the present invention to ensure that uniform and consistent root and crests exist on mating parts to derive consistent friction stopping forces in conjunction with relatively low wear within the expected system life of the components. The enveloped worm of the present invention reduces the output gear size, because of significant increase in the number of teeth sharing the tooth load. The enveloped worm is allowed to move axially when overtorqued. The enveloped worm is supported on bearings, ball journals, rollers or the like at two ends and each end is spring loaded inwardly toward the center of the enveloped worm with a preload at both ends of the worm set at a maximum torque for actuator actuation, where the axial force equals torque divided by the radius to the pitchline of the output gear (F=T÷R). Typical applications for worm gearing include drives for moving an automotive component into a stop, typically with an armature operating at approximately 3,000 revolution per minutes. For example, the worm gearing can be used in window lifts, wiper actuators, sliding doors, adjustable seats, antenna lifts or the like.

The apparatus according to the present invention is responsive to a reaction force transmitted through intermeshing gear means for transmitting rotation through an angle. The gear means can include an elongated, enveloping worm gear having a longitudinally extending axis of rotation and an output gear having an axis of rotation offset from and perpendicular to the longitudinally extending axis of the worm gear. The worm gear is movable axially in response to a predetermined torque force or a predetermined reaction force. Biasing means is disposed adjacent at least one end of the worm gear for centering the worm gear with respect to the output gear when subjected to force below the predetermined torque force or the predetermined reaction force. The biasing means normally maintains the enveloped worm gear pitch diameter coincident with the pitch diameter of the output gear.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

The present invention relates to an enveloped worm 10 to reduce the size of an output gear 12 because of a significant increase in the number of teeth 14 and 16 on the worm and gear respectively, sharing the tooth load. The enveloped design requires the centering of the worm 10 on the center line 13 of the gear 12 to ensure uniform gear to worm fit with respect to the pitch diameter of the enveloped worm 10 and the pitch diameter of the output gear 12. Axial movement of the enveloped worm 10 along the axis of rotation 11 in either direction places the worm 10 in a non-centered orientation with respect to the gear 12 and creates tooth and pitchline interference resulting in jamming and high rotational friction. The present invention uses the reaction torque of the worm to force a preloaded worm off center thereby causing pitchline interference to jam, or brake, the stored rotary energy in a rotor or armature. This inherent braking action eliminates the need for an elaborate spring or rubber energy take-up device typically used in actuators that drive a load into a hard stop. Uniform and consistent roots and crests are required to exist on the mating parts, worm 10 and gear 12, to derive consistent friction stopping forces in conjunction with relatively low wear within the expected system life.

Figure 1:
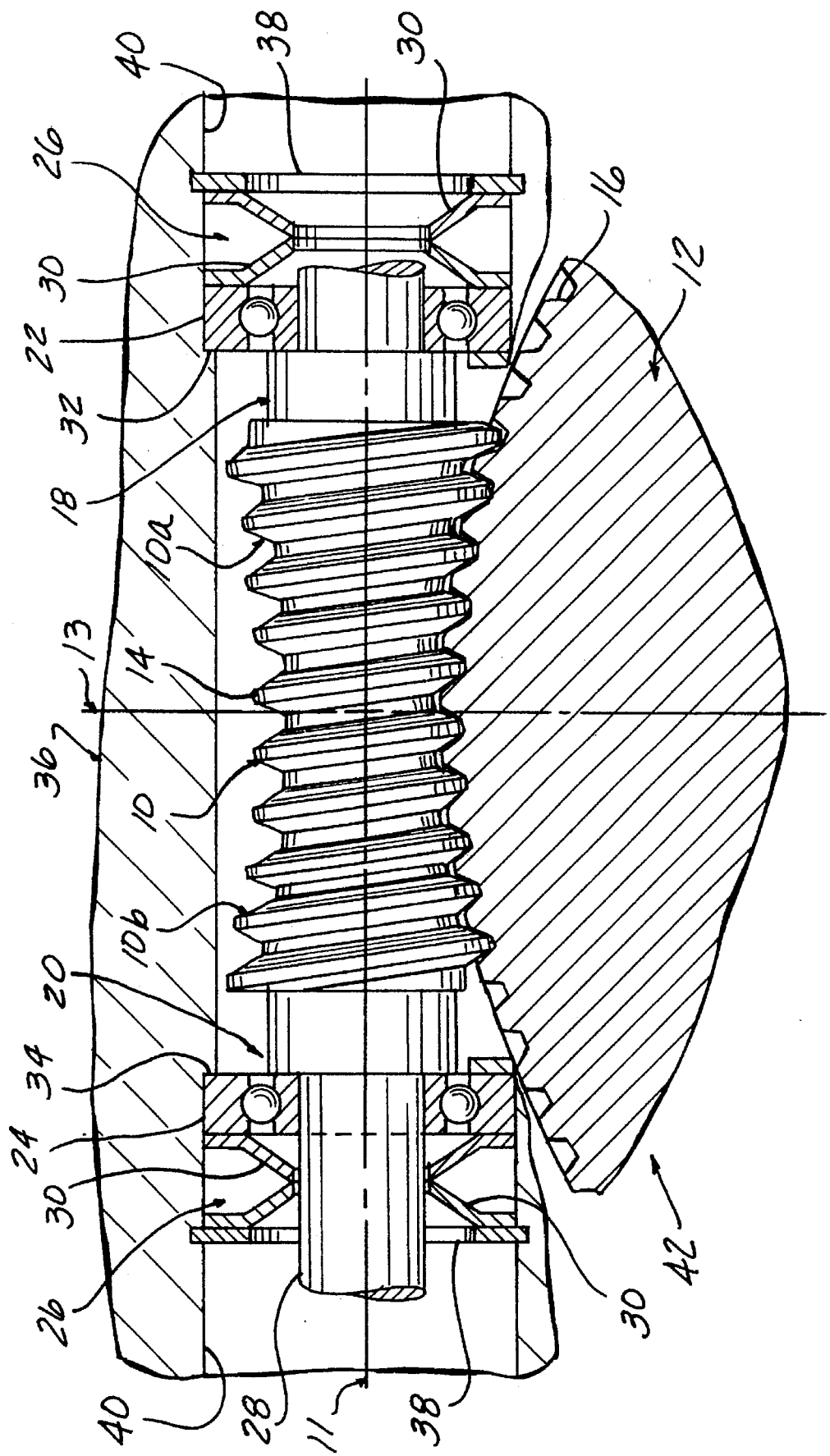
FIG. 1 is a side elevational view of an enveloped worm gear according to the present invention with various portions broken away for clarity and certain portions shown in cross-section.
Figure 2:
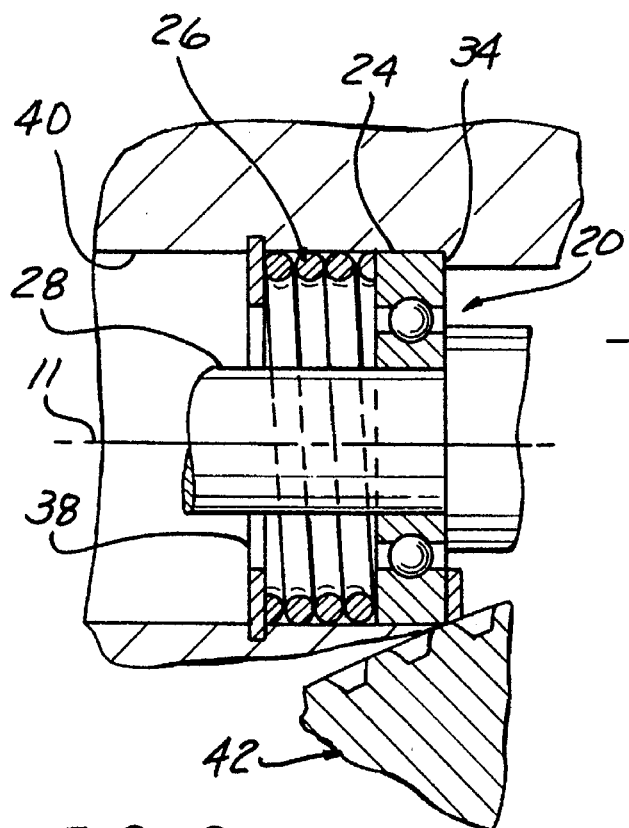
FIG. 2 is a detail view of biasing means including a compression spring.
Figure 5:
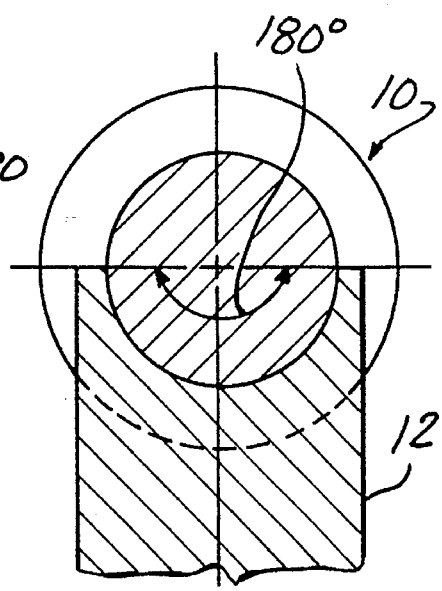
FIG. 5 is a worm gear and output gear in intermeshing throat contact about generally 180° of an external circumferential periphery of the worm gear with respect to the axis of rotation of the worm gear.
Figure 4:
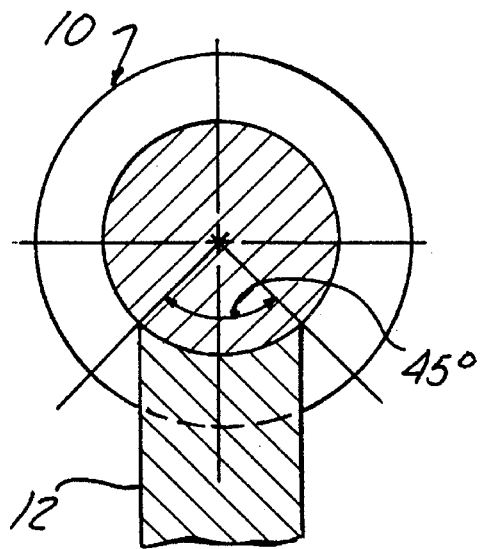
FIG. 4 is a detail view of a worm gear and an output gear in intermeshing throat contact about generally 45° of an external circumferential periphery of the worm gear with respect to the axis of rotation of the worm gear.
Figure 3:
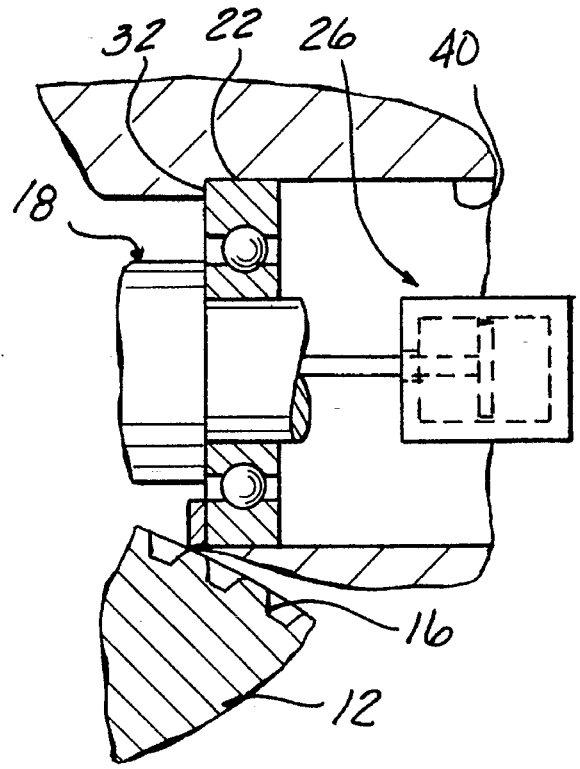
FIG. 3 is a detail view of biasing means including a pressurized fluid chamber for producing a hydraulic force or a pneumatic force.

The enveloped worm is allowed to move axially when overtorqued. As illustrated in FIGS. 1–5, the enveloped worm 10 is supported on opposite ends, 18 and 20, by bearings 22 and 24 respectively, such as ball journals, rollers or the like. The bearings 22 and 24 are biased inwardly toward the center of the enveloped worm 10 with biasing means 26 for normally urging the enveloped worm 10 to a position centered with respect to the center line of the gear 12. The biasing means 26 preloads the springs to be set at a maximum torque for actuator actuation on both ends of the worm. The preload spring force can be determined by dividing the predetermined torque overload value by the pitch radius of the gear 12 (F=T÷R). The biasing means can include at least one belleville washer, or other preload means, such as a compression spring, hydraulic force, pneumatic force or the like.

The present invention can include a single or double enveloped worm 10 and gear 12. The present invention can include a single cone or side 10a of enveloped worm 10 or double cone or sides 10a, 10b of worm 10. The gear 12 and worm 10 can envelope one another with respect to an arc of generally between 45° to 180° inclusive about a circumferential periphery of the worm 10, sometimes referred to as the "throat" of the worm. The worm 10 and gear 12 intermeshingly engage along a common pitchline extending circumferentially with respect to the gear 12 and axially with respect to the worm 10 through an arc of at least 8°, such that at least three teeth are engaged. The actual angle of intermeshing engagement with respect to the worm 12 and gear 10 depends on the gear size and tooth size. The present invention can also include single or multiple lead worms 10 depending on the desired operating characteristics for the environment in which the enveloped worm gearing is to be used. In the automotive setting, it is common to drive a component into a stop with an armature operating at approximately 3000 revolutions per minute. This creates a great deal of stress on the teeth, 14 and 16, of the worm 10 and gear 12, respectively. In the past, it has been necessary to provide an elaborate spring or rubber energy take-up device in order to absorb the rotary energy stored in the rotor or armature of the drive unit as the component is driven into a hard stop. The present invention is designed to eliminate the need for providing the additional elaborate spring or rubber energy take-up device by providing the biasing means 26 adjacent at least one end of the worm gear 10 for normally centering the smallest diameter portion of the worm gear 10 in a radially extending plane with respect to the rotational axis of the output gear 12 when subjected to a reaction force below the predetermined reaction force. The reaction force of the enveloped worm 10 corresponds to the input torque applied to the driving shaft 28 connected to the enveloped worm 10. The biasing means 26 can include at least one, and preferably two belleville spring washers 30 at each end, 18 and 20, urging the corresponding bearings 22 and 24 respectively, inwardly toward the center of the enveloped worm 10 until seated against respective shoulders, 32 and 34, of the housing 36. Snap rings 38, sometimes referred to C-clip retainers, can be positioned within the aperture 40 through the housing 36 to hold the spring washers 30 with respect to the bearings, 22 and 24 respectively, on opposite ends 18 and 20 of the worm 10.

The apparatus according to the present invention is responsive to a reaction force from the intermeshing gear means 42 for transmitting rotation through an angle. The gear means 42 includes the elongated, enveloping worm gear 10. The worm gear 10 has a longitudinally extending axis of rotation. The gear means 42 also includes the output gear 12 having an axis of rotation offset from and perpendicular to the longitudinally extending axis of the worm gear 10. The worm gear 10 is movable axially in response to a predetermined reaction force corresponding to a predetermined torque force from an actuator (not shown) connected to drive shaft 28. The biasing means 26 is disposed adjacent at least one end of the worm gear 10 for centering the worm gear 10 with respect to the output gear 12 when subjected to a force below the predetermined reaction force. Preferably, the biasing means 26 is disposed adjacent both longitudinal ends, 18 and 20 respectively, of the worm gear 10 for allowing axial movement in both longitudinal directions. The biasing means can include at least one belleville spring washer 30. When a force greater than the predetermined reaction force is applied to the enveloped worm 10, the enveloped worm 10 moves axially overcoming the preloaded force imposed by the biasing means 26 causing non-centered alignment of the worm gear 10 with respect to the output gear 12 and corresponding tooth and pitchline interference resulting in a high rotary friction brake force application to the rotary actuator. As the worm gear 10 moves to a non-centered alignment, the pitch diameters of the worm gear are no longer aligned with the pitch diameters of the output gear and the worm teeth 14 are wedgingly engaged into the gear teeth 16 increasing the frictional force required to continue turning the gearing. In addition, it is believed that lubricant may be squeezed out between the worm tooth and gear tooth interface with the high normal force further increasing the frictional effect and providing for the desired energy absorption by the worm gearing without the need for additional elaborate energy absorption devices being added to the rotary transmission apparatus. Some energy is also absorbed by the compression of the elastic gear material and flexing of the shaft. Also, when deeper engagement occurs, the teeth are loaded more favorably to lower tooth stress, reducing the likelihood of binding and increasing strength.

The output gear 12 preferably envelopes the worm gear 10 to define a double enveloping intermeshing gear means 42 for transmitting rotary motion from the actuator (not shown) to a component (not shown). The intermeshing gear means 42 can provide for frictionally braking bi-directional rotary motion when moved from a first position centered with respect to the output gear 12 to a second position off center with respect to the output gear 12. Therefore, the present invention can be used for reversible drives that drive a component into a hard stop in both rotational directions. In other words, the worm gear 10 moves axially from the first position, centered with respect to the output gear 12, to a second position, non-centered with respect to the output gear 12, when subjected to a torque force greater than the predetermined torque force in a clockwise direction of rotation or a counterclockwise direction of rotation. The torque forces correspond to a reaction force in the worm 10, such that the biasing means 26 is selected to provide the desired preload force through the bearing 22 or 24 to the worm 10 to prevent axial movement of the worm 10 from the centered position with respect to the output gear 12 until the reaction force of the worm 10 is greater than the selected preload force of the biasing means 26.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An apparatus responsive to a reaction force for absorbing rotary energy comprising:

intermeshing gear means for transmitting rotation through an angle, said gear means including an elongated, enveloping worm gear having a longitudinally extending axis of rotation and an output gear having an axis of rotation offset from and perpendicular to said longitudinally extending axis of said worm gear, said worm gear moveable axially in response to a predetermined reaction force, said intermeshing gear means for frictionally braking bi-directional rotary motion when moved from a first position centered with respect to said output gear to a second position off-center with respect to said output gear; and biasing means, adjacent at least one end of said worm gear, for centering said worm gear with respect to said output gear when subjected to force below said predetermined reaction force.

2. The apparatus of claim 1 further comprising:

said biasing means adjacent both longitudinal ends of said worm gear for allowing axial movement in both longitudinal directions.

3. The apparatus of claim 1 further comprising:

said biasing means including at least one preload member selected from a group including a belleville spring washer, a compression spring, a pressurized fluid chamber, a hydraulic force and a pneumatic force.

4. The apparatus of claim 1 further comprising:

a shaft connected to said worm gear for rotation about said longitudinal axis, said shaft having rotary energy stored therein when rotating, such that when said gear means drives into a hard stop, said worm gear is subjected to a force greater than said predetermined reaction force causing non-centered alignment of said worm gear with respect to said output gear and corresponding tooth and pitchline interference resulting in a high rotary friction brake force application to said shaft.

5. The apparatus of claim 1 further comprising:

said output gear enveloping said worm gear to define a double enveloping intermeshing gear means for transmitting rotary motion.

6. The apparatus of claim 1 further comprising:

said worm gear moved axially from said first position to said second position when subjected to a torque force greater than a predetermined torque force in a clockwise direction of rotation and a counterclockwise direction of rotation.

7. The apparatus of claim 1 further comprising:

said worm gear having at least one conical side in intermeshing engagement with said output gear, said conical side of said worm gear having an enlarged diameter at one end and decreasing diametrically along an axial length to a reduced diameter.

8. The apparatus of claim 1 further comprising:

said worm gear having two opposed conical sides in intermeshing engagement with said output gear, said conical sides having a common reduced diameter generally midway between outer ends of said worm gear and increasing diametrically along an axial length from said reduced diameter to an enlarged diameter at said outer ends.

9. The apparatus of claim 1 further comprising:

said worm gear and output gear in intermeshing pitchline contact about at least 8° of an external circumferential periphery of said worm gear and output gear with respect to said axis of rotation of said output gear.

10. The apparatus of claim 1 further comprising:

said worm gear and output gear in intermeshing throat contact between generally 45° and 180° of an external circumferential periphery of said worm gear with respect to said axis of rotation of said worm gear.

11. The apparatus of claim 1 further comprising:

said worm gear and output gear in intermeshing throat contact less than generally 180° about an external circumferential periphery of said worm gear with respect to said axis of rotation of said worm gear.

12. An apparatus responsive to a reaction force for absorbing rotary energy comprising:

intermeshing gear means for transmitting rotation through an angle, said gear means including an elongated, enveloping worm gear having a longitudinally extending axis of rotation and an output gear having an axis of rotation offset from and perpendicular to said longitudinally extending axis of said worm gear, said output gear enveloping said worm gear to define a double enveloping intermeshing gear means for transmitting rotary motion, said worm gear moveable axially in response to a predetermined reaction force; and biasing means, adjacent both ends of said worm gear, for centering said worm gear with respect to said output gear when subjected to force below said predetermined reaction force.

13. The apparatus of claim 12 further comprising:

said biasing means including at least one preload member selected from a group including a belleville spring washer, a compression spring, a pressurized fluid chamber, a hydraulic force and a pneumatic force.

14. The apparatus of claim 12 further comprising:

said intermeshing gear means for frictionally braking bi-directional rotary motion when moved from a first position centered with respect to said output gear to a second position off-center with respect to said output gear.

15. The apparatus of claim 14 further comprising:

said worm gear moved axially from said first position to said second position when subjected to a torque force greater than a predetermined torque force in a clockwise direction of rotation and a counterclockwise direction of rotation.

16. The apparatus of claim 12 further comprising:

said worm gear having at least one conical side in intermeshing engagement with said output gear, said conical side of said worm gear having an enlarged diameter at one end and decreasing diametrically along an axial length to a reduced diameter.

17. The apparatus of claim 12 further comprising:

said worm gear having two opposed conical sides in intermeshing engagement with said output gear, said conical sides having a common reduced diameter generally midway between outer ends of said worm gear and increasing diametrically along an axial length from said reduced diameter to an enlarged diameter at said outer ends.

18. The apparatus of claim 12 further comprising:

said worm gear and output gear in intermeshing throat contact between generally 45° and 180° of an external circumferential periphery of said worm gear with respect to said axis of rotation of said worm gear.

19. The apparatus of claim 12 further comprising:

said worm gear and output gear in intermeshing throat contact less than generally 180° about an external circumferential periphery of said worm gear with respect to said axis of rotation of said worm gear.

\* \* \* \* \*